(12) United States Patent
Nagy

(10) Patent No.: US 8,730,094 B2
(45) Date of Patent: *May 20, 2014

(54) METHOD FOR DETERMINING THE DISTANCE OF A VEHICLE FROM A RADIO BEACON AND RADIO BEACON FOR THIS PURPOSE

(75) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 32 days.

This patent is subject to a terminal disclaimer.

(21) Appl. No.: 13/299,233

(22) Filed: Nov. 17, 2011

(65) Prior Publication Data

US 2012/0139774 A1 Jun. 7, 2012

(30) Foreign Application Priority Data

Dec. 7, 2010 (EP) .................................... 10450189

(51) Int. Cl.
*G01S 11/10* (2006.01)
*G07B 15/02* (2011.01)

(52) U.S. Cl.
USPC ............ 342/125; 342/118; 342/128; 340/928

(58) Field of Classification Search
USPC ........................................................ 342/118
See application file for complete search history.

(56) References Cited

U.S. PATENT DOCUMENTS 3,006,074 A   10/1961   Heller
3,195,136 A   7/1965   Klein
5,790,052 A   8/1998   Grabow
2009/0102718 A1   4/2009   Karlsson
2009/0303004 A1   12/2009   Tuttle

FOREIGN PATENT DOCUMENTS

GB   2 376 585 B   3/2005

OTHER PUBLICATIONS

Examination Report for corresponding New Zealand Application No. 595895, dated Oct. 27, 2011, 2pp.
Search report issued on Jan. 25, 2013 in corresponding Singapore Application No. 201109026-3, 18pp.
International Written Opinion of corresponding PCT/AT2011/000480, received Oct. 7, 2012, 6 pp.
International Written Opinion of corresponding PCT/AT2011/000479, 6 pp.
Extended European Search Report for corresponding European Patent Application No. 10 450 189.5, dated Mar. 16, 2011, 4pp.
International Search Report for corresponding International Application No. PCT/AT2001/000480, dated Feb. 9, 2012, 6pp.
International Search Report for corresponding International Application No. PCT/AT/2011/000479, dated Feb. 23, 2012, 5pp.

*Primary Examiner* — Matthew M Barker
(74) *Attorney, Agent, or Firm* — Fiala & Weaver P.L.L.C.

(57) ABSTRACT

A method and a radio beacon for determining a distance of a vehicle passing a radio beacon of a road toll system, from beacon. The vehicle is equipped with an onboard unit, which emits a signal with a known curve of its frequency over time. The method includes receiving the signal in the radio beacon during passage of the vehicle and recording a curve of its frequency over time in relation to the known frequency curve; detecting a change in the recorded frequency curve exceeding a predetermined threshold value; looking for two far regions in the frequency curve lying before and after the detected change in time and showing a frequency change below a threshold value; scaling the recorded frequency curve in such a manner that the far regions assume predetermined values; and determining the said distance from a gradient of the scaled frequency curve in an inflection point thereof.

12 Claims, 5 Drawing Sheets

METHOD FOR DETERMINING THE DISTANCE OF A VEHICLE FROM A RADIO BEACON AND RADIO BEACON FOR THIS PURPOSE

CROSS-REFERENCE TO RELATED APPLICATION(S)

This application claims priority to European Patent Application No. 10 450 189.5, filed on Dec. 7, 2010, the contents of which are hereby expressly incorporated by reference.

FIELD OF THE INVENTION

The present invention generally relates to signal processing in a road toll system, and more specifically to a method and a radio beacon for determining the distance of a vehicle from the radio beacon, in a road toll system.

BACKGROUND

In radio beacon-based road toll systems, for example, DSRC (dedicated short-range communication) or WAVE (wireless access in a vehicle environment) standards, onboard units (OBUs) carried by the vehicles communicate with geographically distributed radio beacons, as soon as they pass the beacons. The radio communication generally serves to locate the vehicle on the radio coverage area of a radio beacon to charge for usage of locations or simply to transmit toll data generated by the OBU to the radio beacon.

It is often desirable to determine the distance at which the vehicle passes a radio beacon, for example, to penalise toll violations in the case of multi-lane roads. When multiple vehicles travelling next to one another on different lanes pass a radio beacon and a radio communications indicates a toll violation, e.g., a missed toll charge debit, an inadequate balance of a charge account, a defective or incorrectly adjusted OBU, or a lane-dependent charge rate or toll (multiple occupant lane), it is essential to know which of the vehicles travelling next to one another is responsible to be able to identify the vehicle in violation. The identification may be visually in situ or a photo of the vehicle in the road section of the beacon.

Various methods of determining the distance are known currently. One solution is to use multiple physically apart receiving antennas in the radio beacon to determine the positions of the OBUs in the radio receiving field from phase difference measurements between the OBU signals received by the individual antennas. Another solution is known from the U.S. Pat. No. 5,790,052 and is based on Doppler measurements of the different relative speeds of an OBU in relation to physically offset receiving antennas of a radio beacon to determine the ratio of the distances from the two receiving antennas from the ratio of the speed measured values. Finally, it would also be possible to use a separate radio beacon with a low radio coverage range for each lane. All these known solutions are expensive, because they are based on multiple receiving antennas.

SUMMARY

The present invention is directed to a method for determining the distance of an OBU from a radio beacon in a road toll system, which requires lower equipment expenditure for conversion than the known solutions.

In some embodiments, the present invention is a method for determining a distance of a vehicle passing a radio beacon of a road toll system, from said radio beacon, wherein the vehicle is equipped with an onboard unit, which emits a signal with a known curve of a signal frequency over time. The method includes: receiving the signal in the radio beacon and recording a frequency curve of the signal frequency over time, in relation to the known frequency curve; detecting a change in the recorded frequency curve exceeding a first predetermined threshold value; determining two far regions in the recorded frequency curve, wherein the far regions lie before and after the detected change in the recorded frequency curve and indicate a frequency change below a second predetermined threshold value; scaling the recorded frequency curve in such a manner that the far regions assume predetermined values; and determining the distance from a gradient of the scaled frequency curve in an inflection point thereof.

The road lane of a multi-lane road on which the vehicle is moving is then preferably determined from the defined distance. As a result of this, toll violations in the case of parallel passing vehicles can be unequivocally associated with one lane and the vehicle or vehicles located therein.

The inflection point may be determined by seeking a point in the frequency curve at which the frequency has a predetermined value, which is in particular the rated or resting frequency of the OBU. Therefore, this embodiment is suitable for those cases in which the rated frequency of the radio communication of the OBU is previously known.

Alternatively, the inflection point may be determined by seeking a point in the frequency curve at which the frequency corresponds to a frequency mean value of the far regions. The rated frequency of the OBU does not have to be previously known for this embodiment, the process adjusts automatically.

In some embodiments, the present invention is a radio beacon for a road toll system for determining a distance of a vehicle passing the radio beacon, wherein the vehicle is equipped with an onboard unit which emits a signal with a known frequency curve of a signal frequency over time. The radio beacon includes: a receiver configured to receive the signal of the vehicle; a memory coupled to the receiver configured to record a curve of the frequency of the received signal over time in relation to the known frequency curve over time; a detector coupled to the memory and configured to detect a change in the recorded frequency curve exceeding a first predetermined threshold value; an evaluation device coupled to the detector and the memory and configured to determine two far regions in the frequency curve lying before and after the detected change in the recorded frequency curve, the two far regions showing a frequency change below a second predetermined threshold value; a scaling device coupled to the memory and the evaluation device and configured to scale the recorded frequency curve in such a manner that the far regions assume predetermined values; and a differentiator coupled to the scaling device to determine a gradient of the scaled frequency curve in an inflection point thereof and to determine the distance therefrom.

The radio beacon may be installed on a multi-lane road and the differentiator is configured to determine a lane, on which the vehicle is passing, from the distance.

In some embodiments, the differentiator determines the inflection point by seeking a point in the frequency curve, at which the frequency has a predetermined value.

Alternatively, the differentiator determines the inflection point by seeking a point in the frequency curve, at which the frequency corresponds to a frequency mean value of the far regions.

In any case, the received signal can be modulated with a modulation frequency and the said frequency can be the modulation frequency, which is obtained in the receiver by demodulation. The receiver may be a DSRC, WAVE, or other types of transceivers.

DETAILED DESCRIPTION

Figure 1:
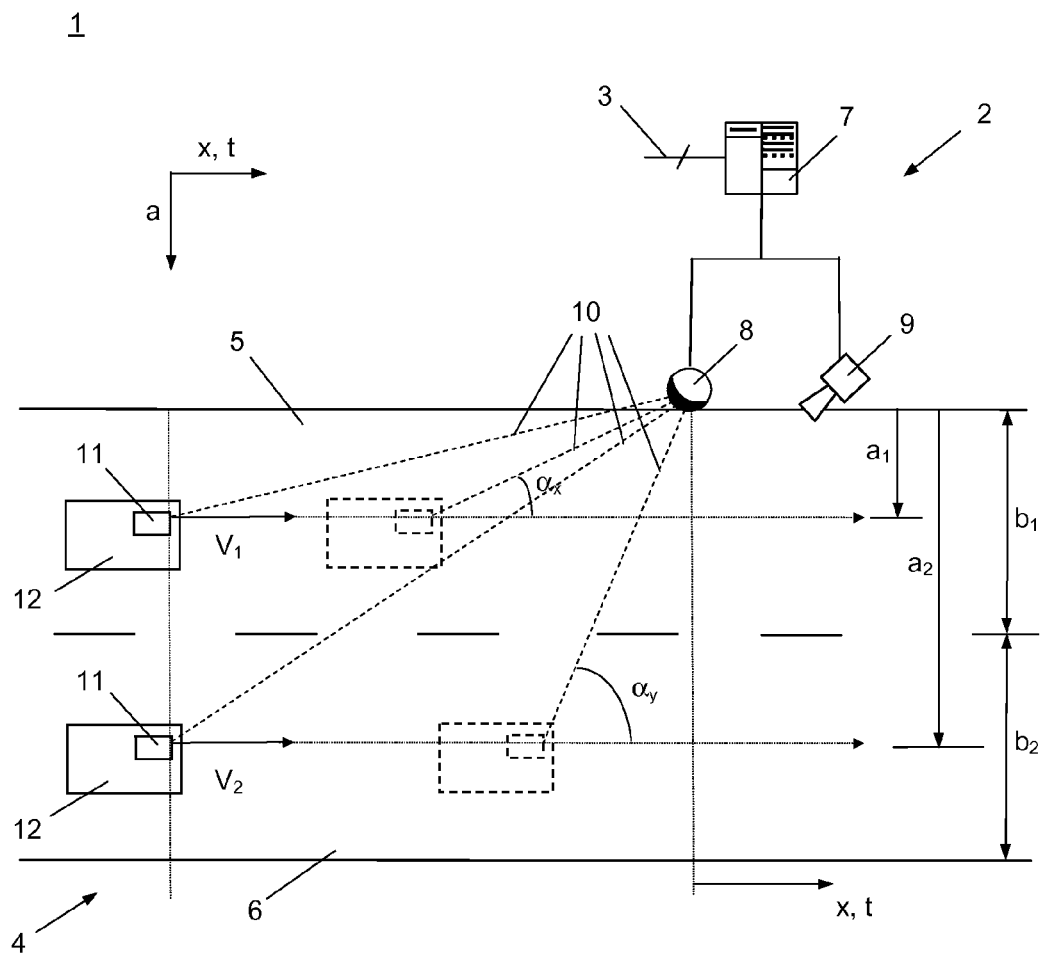
FIG. 1 is a schematic plan view of a radio beacon on a multi-lane road showing the geometric relationships during the passage of two vehicles.

FIG. 1 shows a road toll system 1 comprising a plurality of geographically distributed radio beacons 2 (only one shown for representation) that are in communication with a central control unit (not shown) of the road toll system 1, via data connections 3. The radio beacons 2 are respectively installed on a road 4 that can comprise multiple lanes 5, 6.

For example, the radio beacon 2 includes a local computer 7, a transceiver or receiver 8 ("transceiver/receiver") and a camera 9, which are operated by the computer 7 and can record images of the road 4 and the lanes 5, 6 for evidence of toll violations.

The transceiver/receiver 8 serves to conduct radio communications 10 with onboard units or OBUs 11, carried by vehicles 12 passing the radio beacon 2 in the lanes 5, 6. The radio communications 10 are generally bidirectional data package connections. An analysis of the signals sent by the OBUs 11 to the transceiver/receiver 8 of the radio beacon 2 is sufficient for the purposes of the present invention and therefore the following description will only describe the OBU 11 sending signals 10 to the receiver 8 of the radio beacon 2. However, it is understood that in practice, signals are also sent in the opposite direction.

As shown, vehicles 12 with the OBUs 11 travel in lanes 5, 6 and past the radio beacon 2, more precisely its receiver 8, at different speeds $v_1$, $v_2$ at different passing or normal distances $a_1$, $a_2$, respectively. In this case, the signals 10 emitted by the OBUs 11 are respectively subject to frequency-dependent Doppler shifts in accordance with the following known equation:

$$f_D = \frac{f_s}{1 - \frac{v}{c}} \quad (1)$$

where, $f_s$ is the transmission frequency of the signal 10 of the OBU 11

$f_D$ is the Doppler-shifted receiving frequency of the signal 10 in the radio beacon 2 if the OBU 11 were to move towards it front on;

v is the speed of the OBU 11; and c is the speed of light (signal transmission).

If the OBU 11 travels past the distance 2 at a distance a, equation (1) can be written by means of geometric deliberations as $$f_B \equiv \cos\left[\arctan\left(\frac{a}{x}\right)\right] f_D \quad (2)$$

where, a is the vertical distance of the OBU 11 from the radio beacon 2 in the coordinate system of FIG. 1;

x is the horizontal distance of the OBU 11 from the radio beacon 2 in the coordinate system of FIG. 1; assuming a constant speed v or $v_1$, $v_2$ of the OBUs 11 the horizontal distance also simultaneously corresponds to time t; and $f_B$ is the Doppler-shifted receiving frequency of the signal 10 in the radio beacon 2 when the OBU 11 is moving past it at the distance a.

That is, the invention makes use of the circumstance that at the time of direct passage, the Doppler-related frequency change of the OBU signal is inversely proportional to the normal distance from the radio beacon, when the distance is minimal, so long as the frequency curve is normalised to the inherent speed of the vehicle. The latter is achieved by evaluating the frequency curve in "far regions." In these far regions, the distance of the vehicle compared to the normal distance is very large and this is negligible, and therefore the extent of the Doppler shift there depends substantially only on the inherent speed and this can be determined therefrom. Further, the dependence on the normal distance, and therefore this itself, can be determined from the analysis of the frequency curve compensated by the inherent speed in the near region of the beacon where the greatest change ("Doppler jump") of the frequency pattern occurs in its inflection point. As a result, the passing distance can be determined from the radio communication between the OBU and the radio beacon alone with a single receiver and a single antenna.

The Doppler shift evaluated with the method of the invention can be measured at any desired frequency of the signal, whether it is a carrier frequency or preferably a modulation frequency thereof. Modulation frequency is understood to be a frequency of any desired modulation of the OBU signal, whether it is a simple frequency or amplitude modulation, one of the modulation frequencies of an OFDM modulation, or also a pulse or burst modulation such as occurs as a result of periodic transfers of entire data blocks; such a block repetition rate can also be regarded as a modulation frequency, the Doppler frequency shift of which can be measured.

Figure 2:
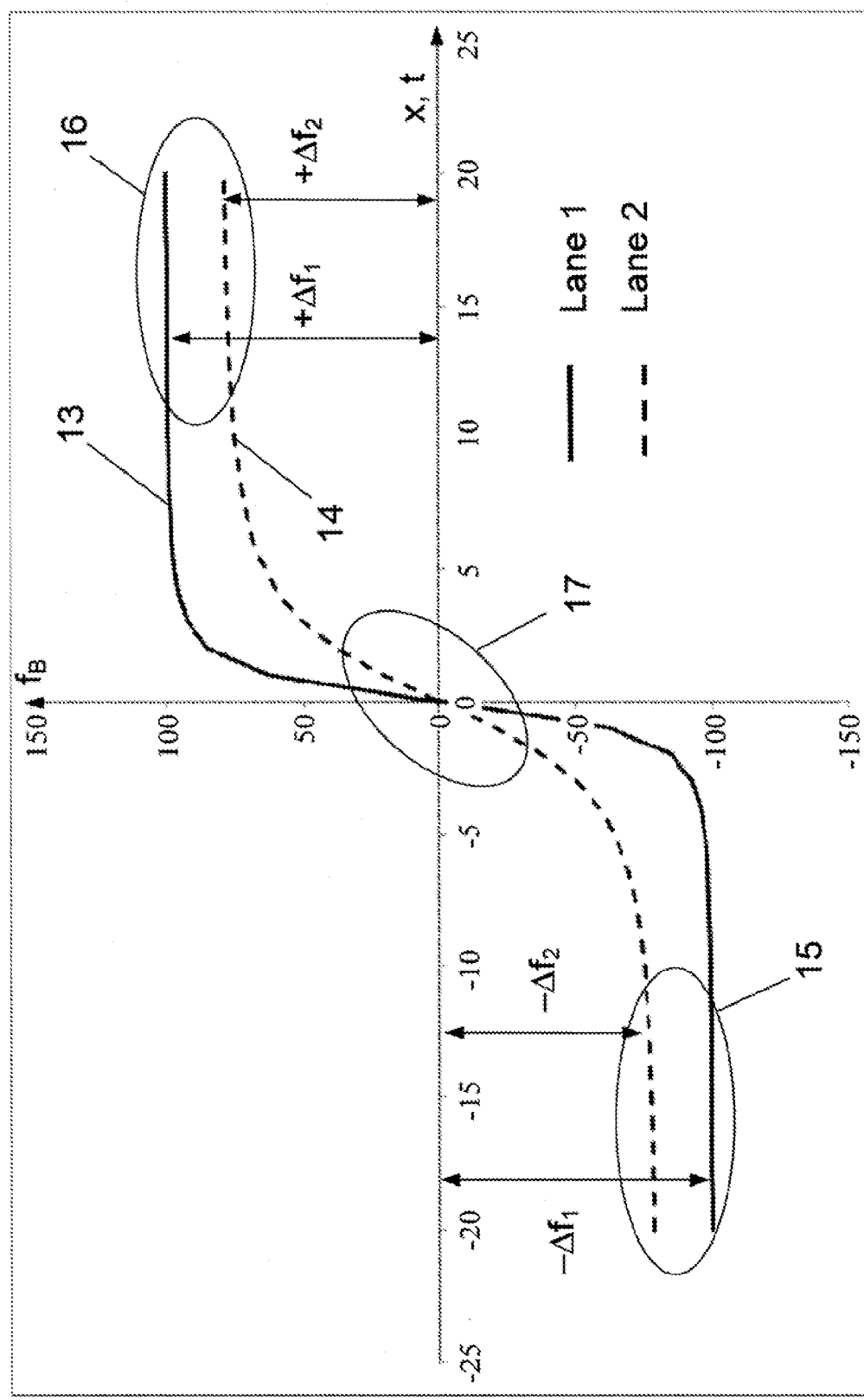
FIG. 2 shows frequency curves of the signals of two vehicles when passing a radio beacon.

FIG. 2 shows two exemplary curves of the receiving frequency $f_B$ in relation to the horizontal distance x, or the time t. The solid line 13 shows the receiving frequency curve for the OBU 11 in lane 5 and the broken line 14 shows that for the OBU 11 in lane 6. As can be seen, the Doppler-related frequency shift $\pm\Delta f_1$, $\pm\Delta f_2$ in "far regions" 15, 16 of the frequency curves 13, 14 far before and after a region 17 of maximum change ($f_B' = \partial f_B/\partial t$) is small. That is, the frequency change $f_B'$ lies below a significance thresholds in the far regions 15, 16.

Therefore, in the far regions 15, 16 (and naturally also further outside the far regions), the extent of the Doppler shift $\pm\Delta f$ is not dependent on the passing distance a any longer and instead, is almost exclusively dependent on the speed v. The effect of the vehicle speed v on the frequency curves 13, 14 can therefore be eliminated by scaling these so that they respectively assume the same value in the far regions 15, 16, for example, a predetermined value $\pm\Delta F$.

Figure 3:
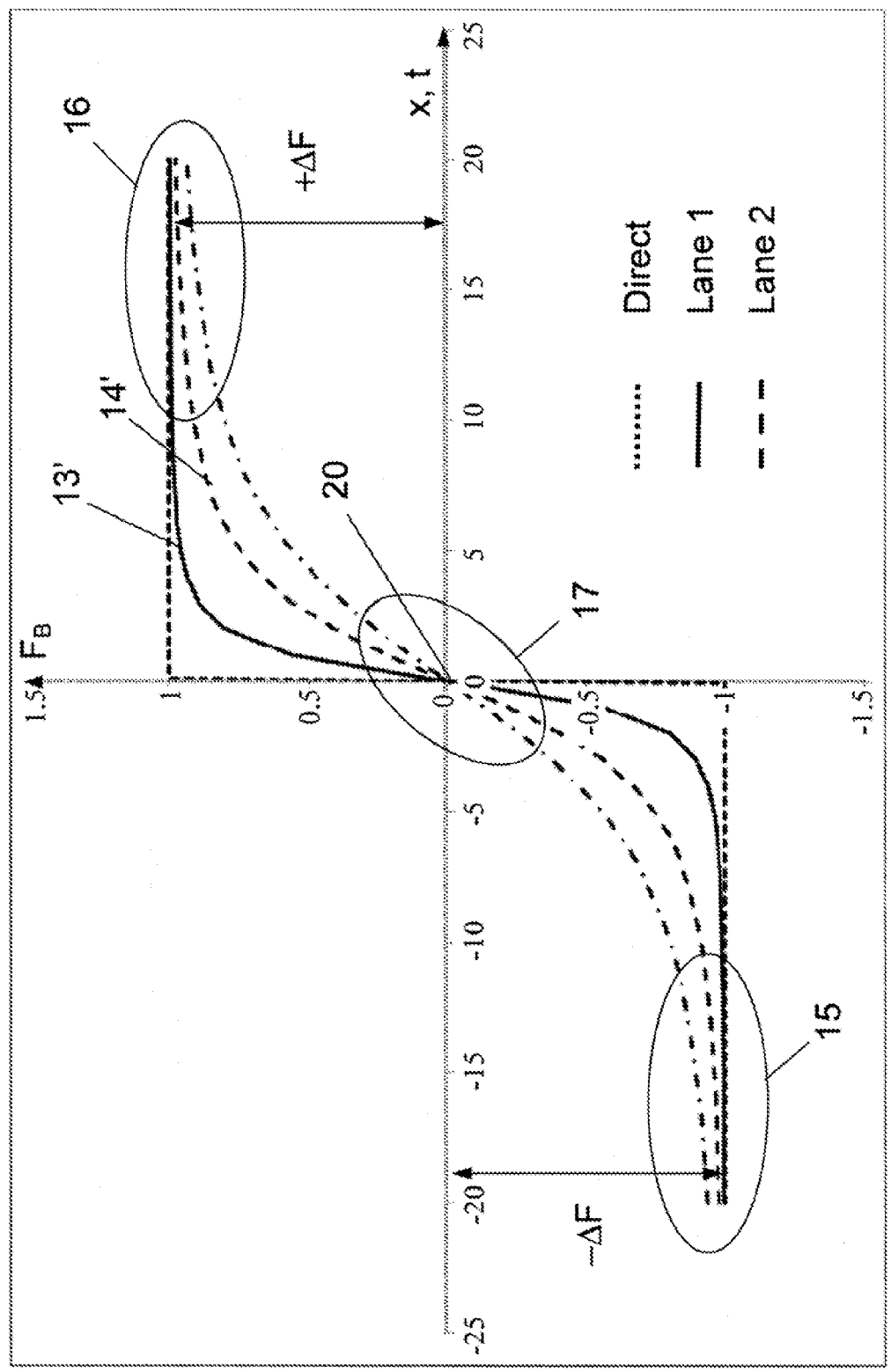
FIG. 3 shows the frequency curves of FIG. 2 after being scaled.

FIG. 3 shows the result of such scaling, in which the indicated frequency curves 13, 14 have been scaled ("normalised") so that they assume the predetermined values $\pm\Delta F$ in the far regions 15, 16.

The scaled frequency curves 13', 14' therefore are more dependent on the ratio a/x, that is, the passing distance a to the horizontal distance x or to the time t, in accordance with the following equation:

$$f_B \equiv \cos\left[\arctan\left(\frac{a}{x}\right)\right] f_s \quad (3)$$

As can be seen from FIG. 3, the scaled frequency curves 13', 14' differ particularly clearly in their gradient $f_B'=\partial F_B/\partial t$ the location x=t=0, at which their curve at the same time shows an inflection point 20. The greater the passing distance a, the "more abraded" the scaled frequency curves 13', 14', i.e. the lower the gradient $f_B'$ at the inflection point 20. Therefore, the passing distance a is inversely proportional to the gradient $f_B'$, in the following manner:

$$\frac{1}{a} \equiv \lim_{x \to 0} f_B'(x) \quad (4)$$

Figure 4:
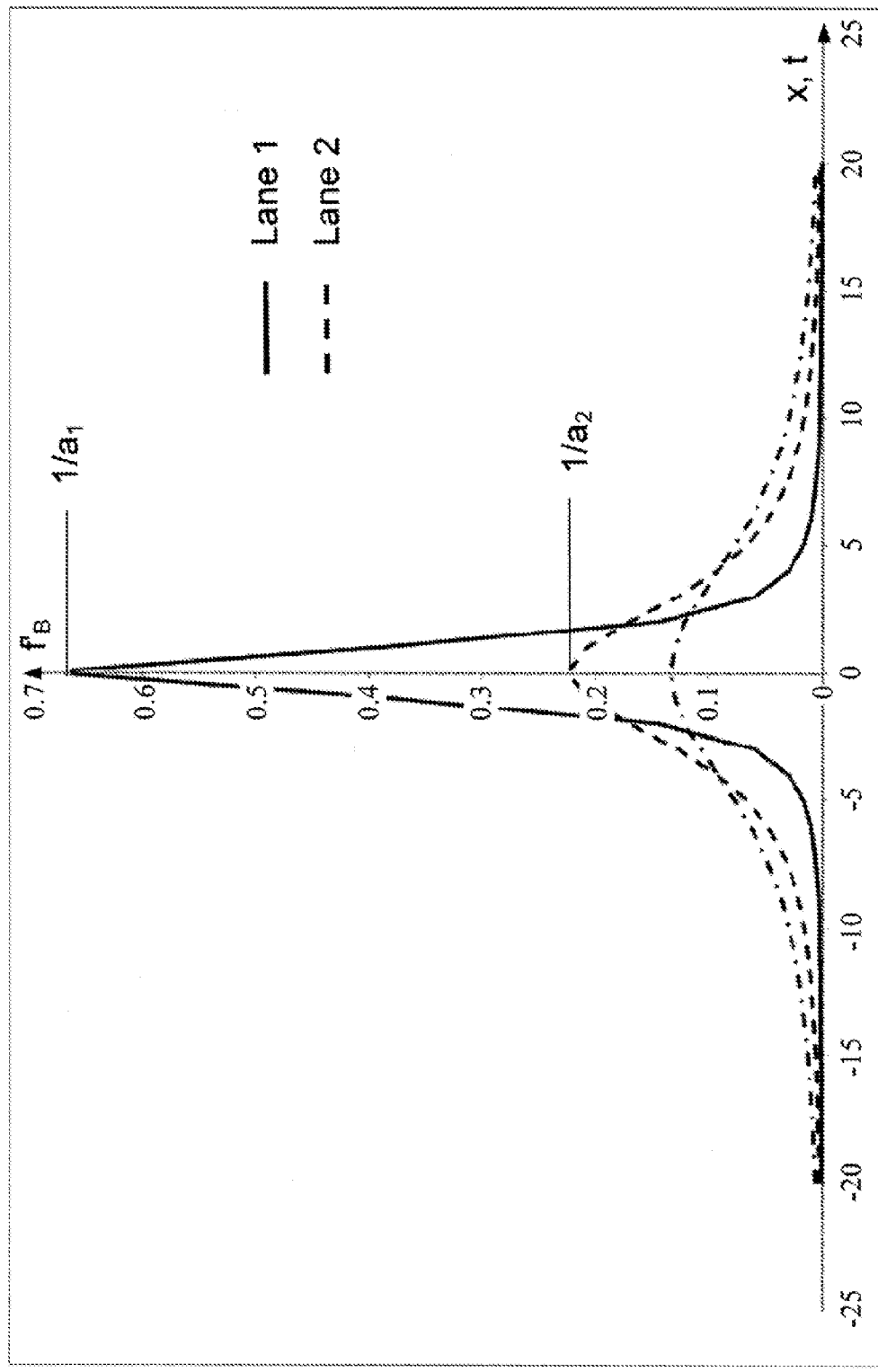
FIG. 4 shows the differentials of the scaled frequency curves of FIG. 3.

The gradient $f_B'$ at the inflection point 20 can be determined by differentiating the scaled frequency curves 13', 14', as shown in FIG. 4. With knowledge of the lane width $b_1$, $b_2$ of lanes 5, 6, the respective lanes 5, 6, in which the OBU 11 was located during the transmission of its signal 10 can be determined from the passing distances $a_1$, $a_2$ determined in this manner. A simple relative comparison of the passing distances $a_1$, $a_2$ is often sufficient to determine the local sequence of the vehicles.

It has been assumed hitherto that the transmitting frequency $f_s$ of the signal 10 of the OBU 11 is constant, i.e., its own frequency curve is a constant curve. However, it is also possible that the OBU 11 transmits a signal 10 with a transmitting frequency curve that is non-constant in time, e.g., in the case of frequency hopping radio communications, in which the transmitting frequency $f_s$ constantly changes, according to a predetermined or known pattern. The recorded receiving frequency curves 13, 14 are recorded relative to the prior known curve of the transmitting frequency $f_s$ over time of the OBU 11, whether it is constant or changing, i.e. is referenced or normalised to these, so that the effect of known changes in transmitting frequency of the OBU 11 can be compensated.

Therefore, in some embodiments, a method for determining the passing distance a of the OBUs 11 passing the radio beacon 2 is configured as follows.

The frequency curve 13, 14 of the signal 10 of the OBU 11 is plotted in relation to time t (=x)—possibly based relatively on a prior known curve of the transmitting frequency $f_s$ over time. The region 17 is approximately determined in the frequency curve 13, 14, at which a significant change occurs, that is, $\partial f_B/\partial t$ exceeds a predetermined detection threshold σ. This serves to obtain a time reference point for seeking the two far regions 15, 16, which must lie before and after the change 17 and be so far removed from this that no further significant frequency change $\partial f_B/\partial t$ occurs in these, i.e. it lies below a predetermined significance threshold ε.

With knowledge of the far regions 15, 16 and the Doppler shifts $\pm\Delta f_1$, $\pm\Delta f_2$ occurring therein (which can also be considered to be quasi-constant because their change does not exceed the significance threshold ε), the frequency curves 13, 14 can now be scaled so that they respectively assume the same predetermined value $\pm\Delta F$ in their far regions 15, 16.

The inflection point 20 is then determined in the scaled frequency curves 13', 14'. For this, the location x or the time t is determined in the frequency curves at which the receiving frequency $f_B$ assumes the frequency mean value (the "middle") between the "quasi-constant" far regions 15, 16, or if the rated frequency of the signal 10 of the resting OBU 11 is known, the receiving frequency $f_B$ assumes this rated frequency. The inflection point 20 can be determined in both ways, that is, both before the scaling in the frequency curves 13, 14, and after the scaling in the scaled frequency curves 13', 14'.

After determining the inflection point 20, the gradient $f_B'$ (x=t=0) of the scaled frequency curves 13', 14' in the inflection point 20 can be determined (see FIG. 4) and the passing distance a or $a_1$, $a_2$ can be determined therefrom, as explained above.

Figure 5:
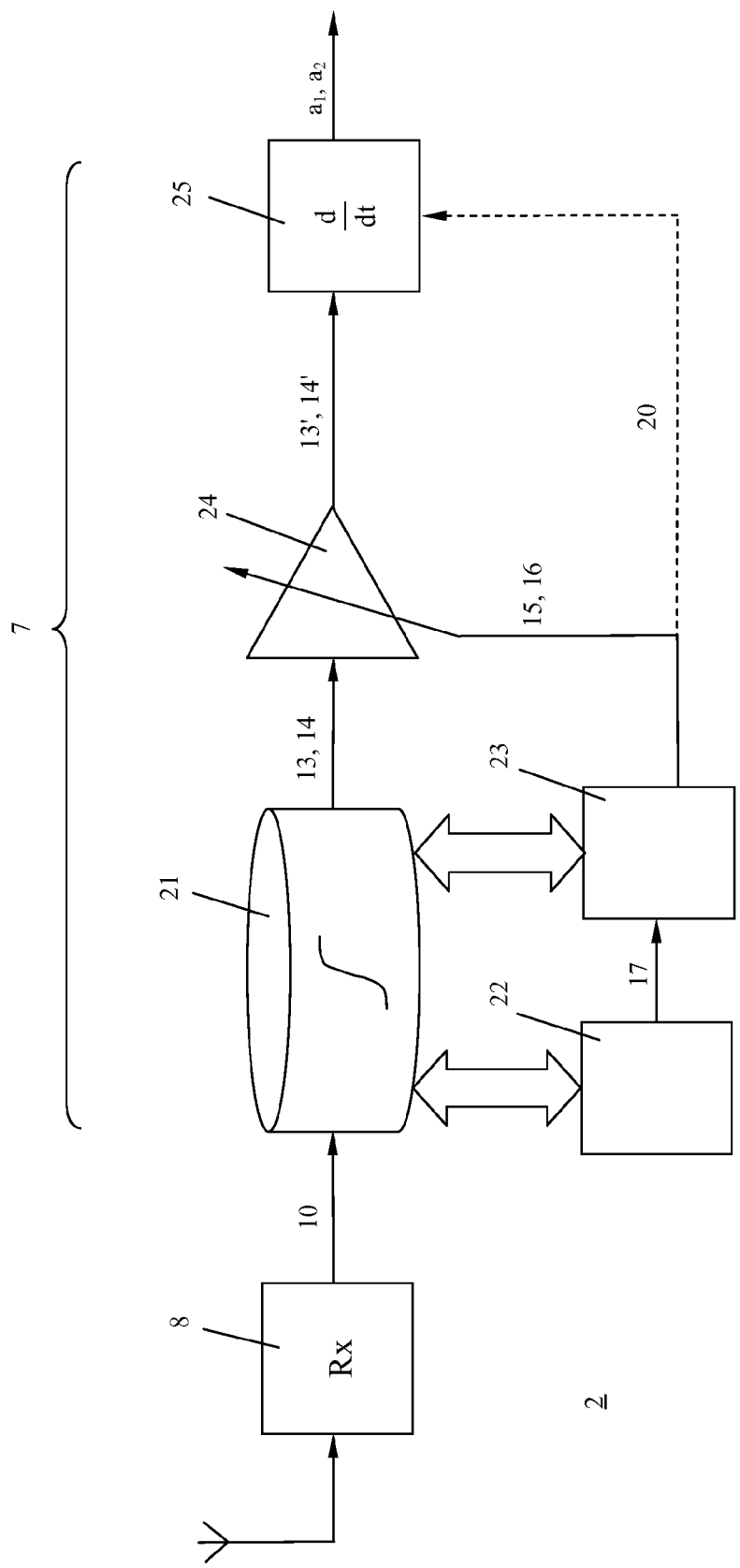
FIG. 5 is an exemplary block diagram of the radio beacon, according to some embodiments of the present invention.

FIG. 5 shows an exemplary hardware configuration of the radio beacon 2 for conducting the outlined method, according to some embodiments of the present invention. Coupled to the receiver 8, the radio beacon 2 has a memory 21, in which the time frequency curves 13, 14 of the received signals 10 are recorded. A detector 22 coupled to the memory 21 detects the change region 17 ($\partial f_B/\partial t > \sigma$) and feeds this information 17 to an evaluation device 23. The evaluation device 23 determines the far regions 15, 16 of the frequency curves 13, 14 with of $\partial f_B/\partial t < \epsilon$ therefrom. With this information 15, 16, the evaluation device 23 actuates a scaling device 24 that scales the frequency curves 13, 14 to scaled frequency curves 13', 14'. The latter are fed to a differentiator 25, which calculates the gradient $f_B'(0)=\partial f_B/\partial t$ the location x=t=0 of its inflection point 20 to determine the passing distances $a_1$, $a_2$ therefrom. In some embodiments, the components 21-25 can be implemented, for example, by the local computer 8 of the radio beacon 2.

The invention is suitable for onboard units with any type of known curves of their transmission frequency over time, whether they transmit a constant frequency, e.g. a constant carrier frequency, in which case the known frequency curve is simply "constant", or they transmit frequencies that vary in the frequency hopping process, the frequency change curve of which is known, so that the frequency curve received in the radio beacon can be normalised or referenced to the known transmission frequency curve.

The method of the invention is suitable for all types of radio beacon-based road toll systems. The method is particularly suitable for DSRC and WAVE road toll systems, in which a DSRC or WAVE transmitter of the onboard unit is used to emit the signal. Other configurations using RFID technology, or also any cellular (e.g. GSM, UMTS, LTE) and near-range radio technologies (e.g. Bluetooth, WLAN), are also possible.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

The invention claimed is:

1. A method for determining a distance of a vehicle passing a radio beacon of a road toll system, from said radio beacon, wherein the vehicle is equipped with an onboard unit, which emits a signal with a known curve of a signal frequency over time, the method comprising:

receiving the signal in the radio beacon and recording a frequency curve of the signal frequency over time, in relation to the known frequency curve;

detecting a change in the recorded frequency curve exceeding a first predetermined threshold value;

determining two far regions in the recorded frequency curve, wherein the far regions lie before and after the detected change in the recorded frequency curve and indicate a frequency change below a second predetermined threshold value;

scaling the recorded frequency curve in such a manner that the far regions assume predetermined values; and determining the distance from a gradient of the scaled frequency curve in an inflection point thereof.

2. The method according to claim 1, wherein a lane of a multi-lane road, on which the vehicle is moving, is determined from the distance.

3. The method according to claim 1, wherein the inflection point is determined by determining a point in the frequency curve, at which the recorded frequency has a predetermined value.

4. The method according to claim 1, wherein the inflection point is determined by determining a point in the recorded frequency curve, which corresponds to a frequency mean value of the far regions.

5. The method according to claim 1, wherein the signal is emitted by the onboard unit as at least one carrier frequency modulated with a modulation frequency, wherein the signal frequency is the modulation frequency.

6. The method according to claim 1, wherein a dedicated short-range communication (DSRC) or a wireless access in a vehicle environment (WAVE) transmitter in the onboard unit is used to emit the signal.

7. A radio beacon for a road toll system for determining a distance of a vehicle passing the radio beacon, wherein the vehicle is equipped with an onboard unit which emits a signal with a known frequency curve of a signal frequency over time, comprising:

a receiver configured to receive the signal of the vehicle;

a memory coupled to the receiver configured to record a curve of the frequency of the received signal over time in relation to the known frequency curve over time;

a detector coupled to the memory and configured to detect a change in the recorded frequency curve exceeding a first predetermined threshold value;

an evaluation device coupled to the detector and the memory and configured to determine two far regions in the frequency curve lying before and after the detected change in the recorded frequency curve, the two far regions showing a frequency change below a second threshold value;

a scaling device coupled to the memory and the evaluation device and configured to scale the recorded frequency curve in such a manner that the far regions assume predetermined values; and a differentiator coupled to the scaling device configured to determine a gradient of the scaled frequency curve in an inflection point thereof and to determine the distance therefrom.

8. The radio beacon according to claim 7, wherein the radio beacon is installed on a multi-lane road and the differentiator is configured to determine a lane, on which the vehicle is passing, from the distance.

9. The radio beacon according to claim 7, wherein the differentiator determines the inflection point by determining a point in the frequency curve, at which the frequency has a predetermined value in the frequency curve.

10. The radio beacon according to claim 7, wherein the differentiator determines the inflection point by determining a point in the frequency curve, at which the frequency corresponds to a frequency mean value of the far regions.

11. The radio beacon according to claim 7, wherein the received signal has at least one carrier frequency modulated with a modulation frequency, and the signal frequency is the modulation frequency, which is obtained in the receiver by demodulation.

12. The radio beacon according to claim 7, wherein the receiver is a dedicated short-range communication (DSRC) or a wireless access in a vehicle environment (WAVE) transceiver.

* * * * *